(12) United States Patent
Greff et al.

(10) Patent No.: US 6,248,800 B1
(45) Date of Patent: Jun. 19, 2001

(54) METHODS FOR STERILIZING CYANOACRYLATE COMPOSITIONS

(75) Inventors: Richard J. Greff, St. Pete Beach, FL (US); Ian N. Askill, Colorado Springs, CO (US)

(73) Assignee: MedLogic Global Corporation, Colorado Springs, CO (US)

( * ) Notice: Subject to any disclaimer, the term of this patent is extended or adjusted under 35 U.S.C. 154(b) by 0 days.

(21) Appl. No.: 09/172,858

(22) Filed: Oct. 15, 1998

(30) Foreign Application Priority Data

Sep. 18, 1998 (GB) .................................................. 9820457

(51) Int. Cl.⁷ ........................................................ C08K 3/28
(52) U.S. Cl. .............................. 521/71; 521/74; 521/77; 521/152; 521/173; 422/1; 422/22; 524/296; 524/297
(58) Field of Search .................... 422/1, 22; 522/71, 522/74, 77, 152, 173; 524/297, 296

(56) References Cited

U.S. PATENT DOCUMENTS

| | | |
|---|---|---|
| 2,784,127 | 3/1957 | Joyner et al. . |
| 3,527,224 | 9/1970 | Rabinowitz et al. . |
| 3,591,676 | 7/1971 | Hawkins et al. . |
| 3,654,239 | 4/1972 | McIntire et al. . |
| 3,667,472 | 6/1972 | Halpern . |
| 3,995,641 | 12/1976 | Kronethal et al. . |
| 4,035,334 | 7/1977 | Davydov et al. . |
| 4,038,345 | 7/1977 | O'Sullivan et al. . |
| 4,444,933 | 4/1984 | Columbus et al. . |
| 4,650,826 | 3/1987 | Waniczek et al. . |
| 4,652,763 | 3/1987 | Nablo . |
| 5,254,132 | 10/1993 | Barley et al. . |
| 5,258,423 | 11/1993 | Crabb et al. . |
| 5,480,935 | 1/1996 | Greff et al. . |
| 5,496,302 | 3/1996 | Minshall et al. . |
| 5,530,037 | 6/1996 | McDonnell et al. . |
| 5,557,109 | 9/1996 | Bidnyy et al. . |
| 5,643,464 | 7/1997 | Rhee et al. . |
| 5,653,789 | 8/1997 | Barley et al. . |
| 5,674,292 | 10/1997 | Tucker et al. . |
| 5,684,042 | 11/1997 | Greff et al. . |
| 5,730,994 | 3/1998 | Askill et al. . |
| 5,874,044 | 2/1999 | Kotzev . |
| 5,998,472 | 12/1999 | Berger et al. . |

FOREIGN PATENT DOCUMENTS

| | | |
|---|---|---|
| 1281457 | 7/1972 | (GB) . |
| 04085340 | 3/1992 | (JP) . |
| WO 99/42142 | 8/1999 | (WO) . |

OTHER PUBLICATIONS

Yoshii, F., et al., "Current R & D Activities at TRCRE in Polymer Processing by EB," *Radiat. Phys. Chem.*, vol. 42, Nos. 1–3, pp. 65–68, 1993.

*Primary Examiner*—Peter D. Mulcahy
(74) *Attorney, Agent, or Firm*—Burns, Doane, Swecker & Mathis LLP

(57) ABSTRACT

Disclosed are methods for sterilizing cyanoacrylate prepolymer compositions under E-beam irradiation conditions wherein the prepolymer remains in polymerizable form after sterilization.

25 Claims, 1 Drawing Sheet

METHODS FOR STERILIZING CYANOACRYLATE COMPOSITIONS

BACKGROUND OF THE INVENTION

Field of the Invention

This invention is directed to methods for sterilizing cyanoacrylate prepolymer compositions under conditions wherein the prepolymer remains in polymerizable (non-gelled) form after sterilization. The methods of this invention employ, in part, E-bean sterilization techniques.

REFERENCES

The following patent applications and patents are cited and/or referenced in this application as superscript numbers:
1. Hawkins, et al., Surgical Adhesive Compositions, U.S. Pat. No. 3,591,676, issued on Jul. 6, 1971
2. Halpern, et al., Adhesive for Living Tissue, U.S. Pat. No. 3,667,472, issued on Jun. 6, 1972
3. McIntire, et al., Process for the Preparation of Poly(α-Cyanoacrylates), U.S. Pat. No. 3,654,239, issued on Apr. 4, 1972
4. Barley, et al., Methods for Treating Non-Suturable Wounds by Use of Cyanoacrylate Adhesives, International Patent Application Publication No. WO 93/25196, published on Dec. 23, 1993
5. Barley, et al., Methods for Treating Suturable Wounds by Use of Sutures and Cyanoacrylate Adhesives, U.S. Pat. No. 5,254,132, issued on Oct. 19, 1993
6. Barley, et al., Methods for Reducing Skin Irritation From Artificial Devices by Use of Cyanoacrylate Adhesives, U.S. Pat. No. 5,653,789, issued on Aug. 5, 1997
7. Rabinowitz, et al., Method of Surgically Bonding Tissue Together, U.S. Pat. No. 3,527,224, issued on Sep. 8, 1970
8. Kronenthal, et al., Surgical Adhesives, U.S. Pat. No. 3,995,641, issued on Dec. 7, 1976
9. Davydov, et al., Medical Adhesive, U.S. Pat. No. 4,035,334, issued on Jul. 12, 1977
10. Waniczek, et al., Stabilized Cyanoacrylate Adhesives Containing Bis-Trialkylsilyl Esters of Sulfuric Acid, U.S. Pat. No. 4,650,826, issued on Mar. 17, 1987
11. Askill, et al., "Methods for Draping Surgical Incision Sites" U.S. Pat. No. 5,730,994 issued on Mar. 24, 1998
12. Stehlik, "Sterilization of Tissue Binding Adhesives", British Patent Application Publication No. 1 281 457, published on Jul. 12, 1972
13. McDonnell, et al., "Sterilized Cyanoacrylate Adhesive Composition, and a Method of Making Such a Composition", U.S. Pat. No. 5,530,037, issued on Jun. 25, 1996
14. Greff, et al., "Cyanoacrylate Adhesive Compositions", U.S. Pat. No. 5,480,935, issued on Jan. 2, 1996
15. Askill, et al., "Package for Cyanoacrylate Composition", U.S. patent application Ser. No. 09/062,514, filed on Apr. 17, 1997
16. O'Sullivan, et al., High Viscosity Cyanoacrylate Adhesive Compositions, and Process for Their Preparation, U.S. Pat. No. 4,038,345, issued on Jul. 26, 1977
17. Joyner, et al., Plasticized Monomeric Adhesive Compositions and Articles Prepared Therefrom, U.S. Pat. No. 2,784,127, issued on Mar. 5, 1957
18. Columbus, et al., Adhesive Cyanoacrylate Compositions with Reduced Adhesion to Skin, U.S. Pat. No. 4,444,933, issued on Apr. 24, 1984
19. Greff, et al., "Cyanoacrylate Compositions Comprising an Antimicrobial Agent", U.S. Pat. No. 5,684,042, issued on Nov. 4, 1998
20. Dimiter, British Patent Application Serial No. 2 306 469A, "Sterilizing Cyanoacrylate Preparations" published Jun. 7, 1997

All of the above patent applications and patents are herein incorporated by reference in their entirety to the same extent as if each individual publication, patent application or patent was specifically and individually indicated to be incorporated by reference in its entirety.

STATE OF THE ART

Compositions comprising cyanoacrylate esters have been disclosed as having adhesive properties suitable for a variety of human medical uses. Such uses include, for example, use as a replacement or adjunct for sutures or staples in closing the dermal layer of an incision after surgery; use as a hemostat; use in covering small non-suturable wounds on skin surfaces; use in inhibiting surface skin irritation arising from friction between the skin surface and artificial devices such as tapes, prosthetic devices, casts, etc.; and use in the in situ formation of a surgical incise drape.[1-6,11]

In each case, when topically applied to mammalian skin, the cyanoacrylate rapidly polymerizes, typically within a minute, to form a coherent, adhesive, polymeric film which strongly adheres to the skin.

Cyanoacrylate esters suggested for such uses include the following structures:

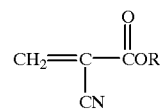

I wherein R is an alkyl or other suitable substituent. Such cyanoacrylate esters are disclosed in, for example, U.S. Pat. Nos. 3,527,224; 3,591,676; 3,667,472; 3,995,641; 4,035,334; and 4,650,826.[1,2,7-10]

In view of the numerous medical uses of cyanoacrylate ester compositions, sterilized forms of these compositions would be particularly beneficial. In fact, it would be particularly desirable if the sterilization techniques were conducted on the packaged product so that, upon sterilization, the sterilized composition could be immediately shipped. Sterilization of the packaged product would thereby prevent reintroduction of microbial contaminants during the packaging step.

However, when applied to cyanoacrylate ester compositions, conventional sterilization techniques are often unsuitable or suffer from undesirable results. For example, it is essential that the selected sterilization technique employed does not result in polymerization of the cyanoacrylate ester and, accordingly, high temperature heat or steam sterilization techniques are contra-indicated, although Dimiter[20] reports the use of heat sterilization temperatures of at least 160° C. for these compositions. Similarly, when sterilization is conducted on packaged cyanoacrylate ester compositions, selected sterilization methods must be able to penetrate the packaging material and sterilize the entire contents of the package including the cyanoacrylate ester composition.

In point of fact, Stehlik[12] recites that normal sterilization processes such as steam-sterilization, heat sterilization, gas treatment, sterile filtration and ionizing radiation at room temperature are unacceptable because these processes result in polymerization of the cyanoacrylate ester leading to solid compositions unsuitable for use as adhesives. Stehlik goes on to disclose that sterilization of cyanoacrylate compositions can be preferably achieved by first solidifying the composition by freezing the composition at very low temperatures (−196° C. and −80° C. being disclosed in the examples) and then exposing the frozen, solidified composition to γ-ionizing radiation. In this reference, radiation doses of, e.g., 1.5 Mrad of $Co^{60}$ γ-radiation, were disclosed as killing bacterial spores.

It is apparent, however, that the use of low temperatures to achieve solidification of the cyanoacrylate ester composition is not practical for manufacture on an industrial scale.

McDonnell, et al.[13] also recite that most sterilization methods are unsuitable or suffer severe limitations in their applicability to cyanoacrylate compositions and, in particular, packaged cyanoacrylate compositions. In fact, this reference discloses that sterilization via electron beam (E-beam) exposure is unacceptable because E-beam accelerators have relatively low penetrating ability and would be effective only in sterilizing the outer surfaces of the package. McDonnell, et al. then recites sterilization techniques using a very high dose of γ-irradiation (at least 2.5 mRad) delivered to the composition at room temperature.

However, high doses of agressively penetrating γ radiation will cause changes in the formulation and attempts to minimize these changes require the addition of very high levels of inhibitors. Such high levels of inhibitors increase the toxicity of the mixture and increase the toxic by-products formed upon γ irradiation. The use of high doses of toxic γ-radiation to effect sterilization also raises safety concerns for workers who are exposed long term to this radiation.

SUMMARY OF THE INVENTION

This invention is directed to methods for sterilizing cyanoacrylate ester compositions. In particular, this invention is directed to the novel and unexpected result that, under carefully controlled conditions, packaged cyanoacrylate ester compositions can be sterilized using E-beam irradiation at room temperature conditions. In addition, E-beam irradiation poses significantly reduced health risks to workers exposed long term to this radiation, reduces the need for excessive amounts of inhibitors, and it is contemplated that use of E-beam irradiation will result in reduced levels of decomposition products as compared to γ irradiation.

In a particular aspect, it has been discovered that employing a sufficiently energetic E-beam source coupled with an average bulk density of the materials comprising the packaging elements of no more than about 0.2 $g/cm^3$ allows for sterilization of the package and the cyanoacrylate ester composition therein. Preferred E-beam dosages are from of about 5 to 50 kGray and preferably from about 15 to 20 kGray. This result is particularly surprising in view of the fact that the prior art teaches that E-beam irradiation is unsuitable for sterilizing cyanoacrylate compositions.

Accordingly, in one of its method aspects, this invention is directed to a method for preparing a polymerizable, sterile, cyanoacrylate ester composition in a packaging element wherein the method comprises:

(a) selecting a packaging element;

(b) adding a cyanoacrylate ester composition comprising a polymerizable cyanoacrylate ester to the packaging element selected in (a) above; and (c) exposing the packaging element formed in (b) above to a sufficient dosage of E-beam irradiation maintained at an initial fluence of at least 5 μCurie/$cm^2$ to sterilize both the packaging element and the cyanoacrylate ester composition therein without gelling the composition wherein the average bulk density of the materials comprising the packaging element is less than about 0.2 gm/$cm^3$.

In a preferred embodiment, the polymerizable cyanoacrylate ester is a polymerizable monomer or reactive oligomer of a cyanoacrylate ester. Such monomers and reactive oligomers are sometimes referred to herein simply as "prepolymers" and, in monomeric form, are preferably represented by formula I:

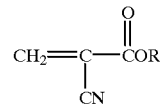

wherein R is selected from the group consisting of:
alkyl of 1 to 10 carbon atoms,
alkenyl of 2 to 10 carbon atoms,
cycloalkyl groups of from 5 to 8 carbon atoms, phenyl,
2-ethoxyethyl,
3-methoxybutyl,
and a substituent of the formula:

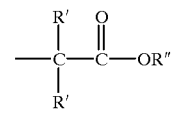

wherein each R' is independently selected from the group consisting of:
hydrogen and methyl, and
R" is selected from the group consisting of:
alkyl of from 1 to 6 carbon atoms,
alkenyl of from 2 to 6 carbon atoms,
alkynyl of from 2 to 6 carbon atoms,
cycloalkyl of from 3 to 8 carbon atoms,
aralkyl selected from the group consisting of benzyl, methylbenzyl and phenylethyl,
phenyl, and
phenyl substituted with 1 to 3 substituents selected from the group consisting of hydroxy, chloro, bromo, nitro, alkyl of 1 to 4 carbon atoms, and alkoxy of from 1 to 4 carbon atoms.

More preferably, in the cyanoacrylate esters of formula I, R is alkyl of from 2 to 10 carbon atoms and still more preferably alkyl of from 4 to 8 carbon atoms. Even more preferably, R is butyl, pentyl or octyl and most preferably, R is n-butyl.

In another preferred embodiment, the cyanoacrylate ester composition added to the packaging element prior to E-beam sterilization is formulated to contain an effective amount of a mixture of a biocompatible acid polymerization inhibitor and a biocompatible free radical polymerization inhibitor to inhibit polymerization of the cyanoacrylate ester and an effective amount of a biocompatible plasticizer.

The preferred mixture of polymerization inhibitors is a biocompatible acid polymerization inhibitor such as sulfur dioxide, glacial acid acid and other well known acid polymerization inhibitors and a biocompatible free radical polymerization inhibitor including hydroquinone and hindered phenols (e.g., 4-methoxyphenol). The acid polymerization inhibitor is preferably $SO_2$ which is preferably employed at from about 50 to 1000 ppm, more preferably from about 50 to 500 ppm, and even more preferably from about 200 to 500 ppm, based on the total weight of the composition. The free radical inhibitor is preferably hydroquinone which is preferably employed at a concentration of from about 50 to 250 ppm and more preferably at about 150 ppm. In a particularly preferred embodiment, the polymerization inhibitor is selected such that it does not form decomposition products on exposure to E-beams which are toxic or irritating to mammalian skin or which cause premature polymerization or prevent the polymerization of the cyanoacrylate ester composition.

Preferred biocompatible plasticizers are dioctyl phthalate and/or acetyl tri -n-butyl citrate which are employed in sufficient amounts to enhance the flexibility of the resulting polymeric cyanoacrylate film. Again, in a particularly preferred embodiment, the biocompatible plasticizer is selected such that it does not form decomposition products on exposure to E-beams which are toxic or irritating to mammalian skin or which cause premature polymerization or prevent the polymerization of the cyanoacrylate ester composition.

In another preferred embodiment, the cyanoacrylate ester composition further comprises a compatible antimicrobial agent and even more preferably an antimicrobial complex of iodine molecules with a biocompatible polymer. Such complexes include the commercially available povidone iodine which can be mixed with the cyanoacrylate composition prior to E-beam sterilization or can be included as a separate component (e.g., a two component system) in the packaged cyanoacrylate composition wherein both components are sterilized by E-beam radiation.

In another of its method aspects, this invention is directed to a method for preparing a polymerizable, sterile, cyanoacrylate ester composition in a packaging element wherein the method comprises:

(a) selecting a packaging element;
(b) adding a cyanoacrylate ester composition to the packaging element selected in (a) above wherein said cyanoacrylate ester composition comprises:
(i) polymerizable cyanoacrylate ester which, in monomeric form, is represented by formula II:

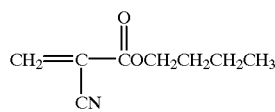

II (ii) from about 50 to 500 ppm of $SO_2$;
(iii) from about 50 to 250 ppm of a free radical inhibitor;
(iv) from about 10 to 30 weight percent of a biocompatible plasticizer based on the total weight of the composition; and
(c) exposing the packaging element formed in (b) above to a sufficient dosage of E-beam irradiation maintained at an initial fluence of at least 5 $\mu$Curie/cm$^2$ to sterilize both the packaging element and the cyanoacrylate ester composition therein without gelling the composition
wherein the average bulk density of the materials comprising the packaging element is less than about 0.2 gm/cm$^3$.

In still another of its method aspects, this invention is directed to a method for preparing a polymerizable, sterile, cyanoacrylate ester composition in a packaging element wherein the method comprises:

(a) selecting a packaging element in the form of an ampule having a neck portion configured for heat sealing after fill;

(b) exposing said ampule to a sufficient amount of a sanitizing agent to reduce the level of bioburden on the ampule;
(c) selecting a cyanoacrylate ester composition which comprises:
(i) polymerizable cyanoacrylate ester which, in monomeric form, is represented by formula II:

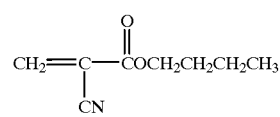

II (ii) from about 50 to 500 ppm of $SO_2$;
(iii) from about 50 to 250 ppm of a free radical inhibitor;
(iv) from about 10 to 30 weight percent of a biocompatible plasticizer based on the total weight of the composition;
(d) filtering said cyanoacrylate ester composition through a biofilter having a maximum pore size of less than about 1 micron;
(e) adding the filtered cyanoacrylate ester composition to the ampule prepared in (b) above;
(f) sealing the ampule prepared in (e) by heat sealing the neck portion of said ampule;
(g) combining ampules produced in (f) above into a set of ampules;
(h) sealing the set of ampules formed in (g) above with a secondary sealing means so as to form a packaging element comprising said set of ampules; and
(i) exposing the packaging element formed in (h) above to a sufficient dosage of E-beam irradiation maintained at an initial fluence of at least 5 $\mu$Curie/cm$^2$ to sterilize both the packaging element and the cyanoacrylate ester composition therein without solidifying or gelling the composition
wherein the average bulk density of the materials comprising the packaging element is less than about 0.2 gm/cm$^3$.

Preferred sanitizing agents include, for example, heat, plasma and ethylene oxide gas.

Preferably, the initial fluence of E-beam radiation is preferably at 8 $\mu$Curie/cm$^2$ and more preferably at least 10 $\mu$Curie/cm$^2$.

DETAILED DESCRIPTION OF THE PREFERRED EMBODIMENTS

Figure 1:
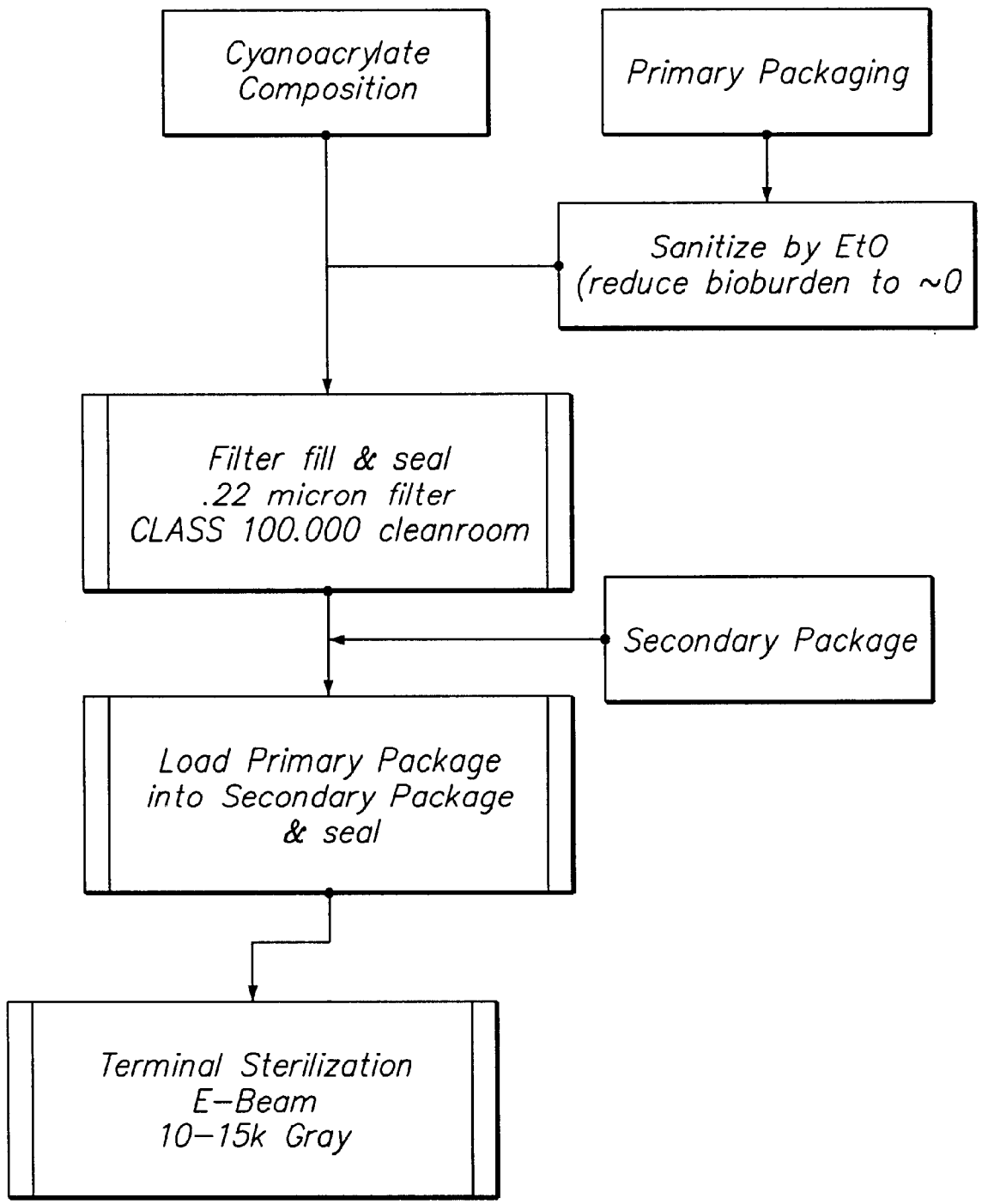
FIG. 1 illustrates a flow diagram for preferred sterilization methods of packaged cyanoacrylate compositions.

This invention is directed, in part, to methods for sterilizing cyanoacrylate prepolymer compositions under E-beam conditions wherein the prepolymer remains in polymerizable, non-gelled form after sterilization. Prior to describing this invention in further detail, the following terms will first be defined.

Definitions

As used herein, the following terms have the following meanings:

The term "cyanoacrylate ester compositions" or "cyanoacrylate compositions" refers to polymerizable formulations comprising polymerizable cyanoacrylate ester monomers and/or oligomers which, in their monomeric form, are preferably compounds represented by formula I as described above.

More preferably, in formula I, R is an alkyl group of from 2 to 10 carbon atoms including, by way of example, ethyl, n-propyl, iso-propyl, n-butyl, iso-butyl, sec-butyl, n-pentyl, iso-pentyl, n-hexyl, iso-hexyl, 2-ethylhexyl, n-heptyl, n-octyl, nonyl, and decyl. More preferably, R is butyl, pentyl or octyl and most preferably, R is n-butyl. Mixtures of such compounds can also be employed.

Polymerizable cyanoacrylate esters are known in the art and are described in, for example, U.S. Pat. Nos. 3,527,224; 3,591,676; 3,667,472; 3,995,641; 4,035,334; and 4,650,826$^{1,2,7-10}$, the disclosures of each are incorporated herein by reference in their entirety.

A particularly preferred cyanoacrylate ester for use in the invention is n -butyl-2-cyanoacrylate.

The polymerizable cyanoacrylate ester compositions described herein rapidly polymerize in the presence of water vapor or tissue protein, and these prepolymers bond human skin tissue without causing histotoxicity or cytotoxicity.

Such polymerizable cyanoacrylate esters are sometimes referred to herein as prepolymers and compositions comprising such esters are sometimes referred to herein as prepolymer compositions.

The term "a biocompatible polymer" refers to polymers which, as iodine complexes (adducts), are compatible with in vivo applications of cyanoacrylate ester compositions onto mammalian skin including human skin. Representative polymers include polyvinylpyrrolidone, copolymers comprising polyvinylpyrrolidone which are optionally crosslinked, and the like. Suitable copolymers include copolymers of polyvinylpyrrolidone and vinyl acetate or other vinyl compounds which copolymers are optionally crosslinked with a polyisocyanate. The molecular weight of these polymers is not critical with number average molecular weights ranging from about 10,000 to about 1,000,000 and preferably from 30,000 to 300,000.

The term "a complex of iodine molecules with a biocompatible polymer" refers to an antimicrobial complex formed by the addition of iodine ($I_2$) to the biocompatible polymer. Such complexes are well known in the art and the resulting complex typically comprises both available iodine and iodide anions. These complexes, on contact with mammalian skin, are antimicrobial apparently by providing for a source of antimicrobial iodine. In any event, such complexes are employed only as starting materials herein and, by themselves, do not form a part of this invention.

These complexes are sometimes referred to herein simply by the term "iodine/polymer complexes". Such iodine/polymer complexes are distinguished from antibiotics which are naturally derived materials from either bacteria or fungi and whose mode of action is to interfere with bacterial processes resulting in bacterial death. Contrarily, the complexes used in this invention are indiscriminate in destroying any microbes including fungi, viruses and bacteria apparently by release of iodine into the microbes and, accordingly, are properly referred to as antimicrobial agents. Surprising, it has been found that iodine/polymer complexes are compatible in cyanoacrylate compositions. In fact, elemental (solid) iodine is incompatible with cyanoacrylate compositions because the addition of elemental iodine renders such compositions non-polymerizable on mammalian skin. Accordingly, complexation of the iodine with the biocompatible polymer is apparently essential for compatibility with the cyanoacrylate composition.

A preferred iodine/polymer complex for use in the compositions of this invention is a polyvinylpyrrolidone iodine complex which is described in, for example, the Tenth Edition of the Merck Index, Published by Merck & Co., Rahway, N.J., USA (1983). This complex is commercially available under the name "povidone-iodine" from BASF, Mt. Olive, N.J., USA.

The term "biocompatible plasticizer" refers to any material which is soluble or dispersible in the cyanoacrylate composition, which increases the flexibility of the resulting polymer film coating on the skin surface, and which, in the amounts employed, is compatible with the skin as measured by the lack of moderate to severe skin irritation. Suitable plasticizers are well known in the art and include those disclosed in U.S. Pat. Nos. 2,784,127[17] and 4,444,933[18] the disclosures of both of which are incorporated herein by reference in their entirety. Specific plasticizers include, by way of example only, acetyl tri-n-butyl citrate (preferably ~20 weight percent or less), acetyl trihexyl citrate (preferably ~20 weight percent or less) butyl benzyl phthalate, dibutyl phthalate, dioctylphthalate, n-butyryl tri-n-hexyl citrate, diethylene glycol dibenzoate (preferably ~20 weight percent or less) and the like. The particular biocompatible plasticizer employed is not critical and preferred plasticizers include dioctylphthalate and acetyl tri-n-butyl citrate.

The term "polymerization inhibitor" refers to mixtures of conventional acid polymerization inhibitors and free radical inhibitors of cyanoacrylate esters including materials such as mixtures comprising a first inhibitor such as sulfur dioxide, glacial acetic acid, C2–C6 organic acids, and the like and a second inhibitor such as hydroquinone and hindered phenols. The polymerization inhibitor is typically employed in amounts effective to inhibit polymerization until application onto mammalian skin.

Because of its compatibility with topical skin applications, the acid polymerization inhibitor is preferably sulfur dioxide which is preferably employed at from about 50 to 1000 ppm, more preferably from about 50 to 500 ppm and even more preferably 200 to 500 ppm, based on the total weight of the composition. Other preferred acid polymerization inhibitors include glacial acetic acid and other organic acids (e.g., $C_2$ to $C_6$ organic acids). Preferred free radical inhibitors include hydroquinone which is preferably employed at from about 50 to 250 ppm. Other free radical inhibitors include hindered phenols such as 4-methoxyphenol, 2,6-di -tert-butylphenol, and the like.

The term "antimicrobial agent" refers to agents which destroy microbes (i.e., bacteria, fungi, viruses and microbial spores) thereby preventing their development and pathogenic action.

The term "initial fluence" of E-beam radiation refers to the fluence of this beam immediately after release from the E-beam accelerator. As is well known, the fluence of an E-beam will be reduced the further it travels from the source.

The term "sanitizing agent" refers to any agent compatible with the packaging elements which, when contacted with these elements, sanitizes the package by reducing bioburden thereon. Preferably, bioburden is reduced to levels of less than about 10 colony forming units (CFU) on individual packaging elements and more preferably less than about 3 CFUs. Preferred sanitizing agents include, for example, heat, plasma and ethylene oxide. Other suitable santizing agents are well known in the art.

The term "average bulk density" refers to the weight of total product to be sterilized divided by its volume.

Methods

The methods of this invention involve E-beam sterilization of packaged cyanoacrylate compositions. In particular, the cyanoacrylate composition is first packaged into a suitable container which is preferably air-tight and moisture resistant. Such containers include, for example, glass, polyalkylene based polymers such as polypropylene or polyethylene, metal foils, and the like. One suitable packaging element is described by Askill, et al.[15] Another suitable packaging element includes ampules made of polyolefins, fluorinated polyolefins and similar materials. Such materials possess low water vapor transmission and are inert to the cyanoacrylate ester.

In a preferred embodiment, the packaging element comprises high density polyethylene ampules having capacity of from about 0.3 to 10 mL of cyanoacrylate composition and a wall thickness of at least about 1 millimeter.

The packaging element is then filled to the desired level with cyanoacrylate ester composition using peristaltic or displacement pumps which are non-reactive with the cyanoacrylate composition. Filling of the packaging element employs any of several well known filling methods and the particular filling method is not critical to this invention and does not form part of the claimed invention. Once filled, the packaging elements are preferably sealed, again by conventional means. If necessary, the sealing means can include auxiliary sealing means. For example, an ampule comprising a screw cap sealing means can be further sealed by placement of a removable polymer coated metal foil (e.g., polyethylene coated foil) over the mouth of the ampule to which the screw cap overlays. Again, any conventional sealing means can be used as the sealing means does not form any part of this invention.

In one preferred embodiment, the ampule is open at one end prior to fill and subsequent to filling with the cyanoacrylate composition, the open terminus is compressed and heated sealed to effect closure.

In a particularly preferred embodiment, the ampule is subjected to a second packaging element such a polyfoil package or bag and then heated sealed to form a unitary packaging element for the ampule. Other secondary packaging elements which are water vapor resistant may employ form fill seal packaging equipment. The unitary packaging elements are then preferably boxed into groups or sets of elements which boxes are then subjected to E-beam sterilization.

In any event, it is necessary that the average bulk density of the materials comprising all of the packaging elements is less than about 0.2 gm/cm$^3$ and preferably less than about 0.15 gm/cm$^3$. At higher densities, it becomes increasingly difficult for the E-beam to pass completely through all of the packaging elements and sterilize the contents of these elements.

The packaging element, whether an individual element or individual elements combined by into larger packaging elements, is subjected to E-beam sterilization. The E-beam generator is any of the conventional and well known generators of high energy electrons which are commercially available for this purpose. In addition, the E-beam radiation employed is maintained at an initial fluence of at least 2 $\mu$Curie/cm$^2$, preferably at least 5 $\mu$Curie/cm$^2$, more preferably at least 8 $\mu$Curie/cm$^2$ and even more preferably 10 $\mu$Curie/cm$^2$. Preferably the E-beam radiation employed has an initial fluence of from about 2 to about 25 $\mu$Curie/cm$^2$.

The dose of E-beam radiation employed is one sufficient to sterilize the packaging element as well as its contents. In a preferred embodiment, the E-beam dosage is preferably from about 5 to 50 kGray and more preferably from about 15 to about 20 kGray with the specific dosage being selected relative to the density of material being subjected to E-beam radiation as well as the amount of bioburden estimated to be therein. Such factors are well within the skill of the art. Upon completion of the sterilization process, the sterilized product is ready for shipment to the ultimate user.

E-beam sterilization is preferably conducted at ambient atmospheric conditions such as a temperature of from about 15° C. to about 30° C. and the exposure time of the product to the E-beam radiation is dependent on the fluence of the radiation employed and the dosage required which is well within the skill of the art. Preferably, exposure of the product to the E-beam is less than 60 seconds.

In a particularly preferred embodiment, sterilization of the cyanoacrylate composition is facilitated by employing steps to reduce biocontamination of the packaging element and/or the cyanoacrylate composition prior to E-beam sterilization. For example, the packaging element can be contacted with compatible sterilization or sanitization conditions prior to fill to reduce bioburden thereon. Since these sterilization or sanitization conditions are employed prior to incorporation of the cyanoacrylate composition, sterilization or sanitization conditions which are compatible with the packaging but would be otherwise incompatible with cyanoacrylate esters can be used including, for example, steam sterilization, heat sterilization, gas treatment, etc.

Likewise, the cyanoacrylate composition is preferably but optionally filtered with a small pore filter (<1 micron pore size) prior to addition to the packaging element. Filtration through, for example, 0.22 micron filter effectively reduces microbial contamination in the cyanoacrylate composition.

Using such steps prior to irradiation with E-beams effectively reduces the E-beam dosage necessary to sterilize the composition.

FIG. 1 illustrates a flow diagram for a particularly preferred embodiment of this invention. Specifically, a primary packaging element such as a high density polyethylene ampule having a density greater than 0.95 gm/cm$^3$ constructed for closure by heat sealing is sanitized by contacting the ampule with ethylene oxide under conventional conditions which reduce the bioburden to approximately zero.

Next, a cyanoacrylate composition is filtered through a small pore filter such as a 0.22 micron filter which comprises material inert to the cyanoacrylate esters such as Telfon® filters. The filtered material is added to the santized ampule which is then heat sealed. Preferably, filtration, addition and sealing are done in a Class 100,000 or better clean room. The cyanoacrylate composition employed in the methods described herein is preferably fully formulated and more preferably contains cyanoacrylate ester prepolymer and polymerization inhibitors and, in some embodiments, a plasticizer and/or an antimicrobial agent such as povidone iodine.

Alternatively, the packaging element can contain the antimicrobial agent as a separate component thereof such that a 2 component system is provided which, at time of use, can be combined to provide for a single composition. See, for example, Lee, et al., U.S. patent application Ser. No. 08/962,869 filed on Nov. 3, 1997 which application is incorporated herein by reference in its entirety.

The primary packaging elements in the form of ampules are then preferably loaded into a secondary packaging element such as a polyfoil package (PET foil polyethylene laminate 2 mil thickness).

In a final step, the packaged product is then subjected to sterilization by exposure to E-beam radiation at a fluence of about 11 $\mu$Curie/cm$^2$ preferably at a dosage of from 15 to 20 kGray.

The methods of this invention are particularly useful insofar as E-beam sterilization does not result in solidification or gelation of the cyanoacrylate ester composition. Rather, the sterilized composition is liquid and retains its polymerizable properties.

The methods of this invention are particularly useful in sterilizing large quantities of individually packaged cyanoacrylate compositions. Quantities having thickness as large as, for example, 50 cm or less, and preferably 20 cm or less, can be sterilized. When sterilizing particularly thick samples, unexposed radiographic film is positioned as several points within the packaging element, and particularly at the distal end from the source of E-beam radiation, is used to ensure adequate dosage of E-beam radiation.

Compositions

The cyanoacrylate compositions used in the methods of this invention are prepared by conventional techniques of mixing the appropriate components until homogenous.

The specific viscosity of these compositions depends, in part, on the intended application of the composition. For example, relatively low viscosities are often preferred where application is to be made to a large surface area (e.g., abdominal surfaces). This preference results from the fact that those forms are less viscous and, accordingly, will permit more facile large surface area application of a thin film. Contrarily, where application is to be made to a specific position on the skin (e.g., elbow surfaces, knee surfaces and the like), higher viscosity compositions, including those containing thixotropic materials, are preferred to prevent "running" of the compositions to unintended locations.

Accordingly, these compositions have a viscosity of from about 2 to 50,000 centipoise at 20° C. Preferably the less viscous compositions have a viscosity of from about 2 to 1,500 centipoise at 20° C. More preferably, the cyanoacrylate ester employed in these compositions is almost entirely in monomeric form and the composition has a viscosity of from about 5 to about 500 centipoise at 20° C.

A thickening agent is optionally employed to increase the viscosity of the composition, which thickening agent is any biocompatible material which increases the viscosity of the composition. Suitable thickening agents include, by way of example, polymethyl methacrylate (PMMA) or other preformed polymers soluble or dispersible in the composition, a suspending agent such as fumed silica and the like with PMMA being preferred. Fumed silica is particularly useful in producing a gel for topical application having a viscosity of from about 1500 to 50,000 centipoise at 20° C. Suitable thickening agents for the compositions described herein also include a partial polymer of the alkyl cyanoacrylate as disclosed in U.S. Pat. Nos. 3,654,239[3] and 4,038,345[16] both of which are incorporated herein by reference in their entirety.

Thickening agents are deemed to be biocompatible if they are soluble or dispersible in the composition and are compatible with the skin as measured by the lack of moderate to severe skin irritation.

Alternatively, the sterilization conditions can be selected such that the cyanoacrylate ester undergoes partial polymerization to reactive oligomers having a higher viscosity.

The cyanoacrylate compositions preferably include a biocompatible plasticizer and such plasticizers are preferably included in the composition from about 10 to 30 weight percent and more preferably from about 18 to 25 weight percent based on the total weight of the composition.

Additionally, the cyanoacrylate compositions described herein preferably include a mixture of polymerization inhibitors in an effective amount to inhibit premature polymerization of the composition during storage. Preferred mixtures of polymerization inhibitors are described above.

The polymerizable cyanoacrylate ester compositions may additionally contain one or more optional additives such as colorants, perfumes, rubber modifiers, modifying agents, etc. In practice, each of these optional additives should be both miscible and compatible with the cyanoacrylate composition and the resulting polymer. Compatible additives are those that do not prevent the use of the cyanoacrylates in the manner described herein.

In general, colorants are added so that the polymer layer formed on the skin will contain a discrete and discernable color. Perfumes are added to provide a pleasant smell to the formulation. Rubber modifiers are added to further enhance the flexibility of the resulting polymer layer. The amount of each of these optional additives employed in the composition is an amount necessary to achieve the desired effect.

Preferred cyanoacrylate compositions useful in the practice of this invention are also disclosed by Greff, et al.[14] which is incorporated herein by reference in its entirety.

In a particularly preferred embodiment, the cyanoacrylate composition further comprises an antimicrobially effective amount of a compatible antimicrobial agent. Such compositions preferably comprise from about 1 to about 30 and more preferably 3 to 20 weight percent of the compatible antimicrobial agent either as a solution or as a suspension based on the total weight of the composition. Compatible antimicrobial agents are those which are either soluble or suspendable in the cyanoacrylate composition, which do not cause premature polymerization of the cyanoacrylate composition, which do not prevent polymerization of the cyanoacrylate composition when applied to mammalian skin, and which are compatible with the intended use including biocompatibility with the patient's skin.

In a particularly preferred embodiment, the compatible antimicrobial agent comprises a complex of iodine molecules with a biocompatible polymer. Such complexes are well known in the art and the resulting complex typically comprises both available iodine and iodide anions. These complexes, on contact with mammalian skin, provide for a source of antimicrobial iodine. In any event, such complexes are employed only as starting materials herein and, by themselves, do not form a part of this invention. Suitable biocompatible polymers include, by way of example only, polyvinylpyrrolidone polymer which, when complexed with iodine, is also referred to under the common name of povidone-iodine available from BASF, Mt. Olive, N.J., USA. When povidone-iodine is employed in the cyanoacrylate composition, the composition preferably comprises from about 1 to about 30 weight percent and more preferably from about 3 to 20 weight percent of povidone-iodine based on the total weight of the composition.

Cyanoacrylate compositions comprising, for example, povidone-iodine are described by Greff, et al.[19], U.S. Pat. No. 5,684,042 which patent is incorporated herein by reference in its entirety.

Other suitable antimicrobial agents include complexes of iodine molecules with copolymers of vinylpyrrolidone and vinyl acetate, copolymers of vinylpyrrolidone and vinyl acetate cross-linked with polyisocyanates, copolymers of vinylpyrrolidone and vinyl functionalities, polymers of pyrrolidone and the like. Preferably, however, the iodine containing polymer is Povidone Iodine which is commercially available from a number of sources.

The use of a compatible antimicrobial agent in the composition permits the agent to be released from the polymeric film formed on mammalian skin thereby inhibiting microbial growth under this film. Additionally, since the film is maintained on mammalian skin for 1–4 days after formation, the release of antimicrobial agent further provides long term anti-infection benefits.

Utility

The methods of this invention are useful in providing sterilized cyanoacrylate compositions which can then be used for topical application to mammalian skin with reduced risk of introducing microbes onto the skin and, accordingly, reduced risk of infection. This is particularly important where topical application is onto skin areas which are already broken (e.g., small topical skin wounds or closing the surgical incision site) or which will become broken (e.g., application to form a surgical incise drape which will then be broken by the incision initiating the surgery).

The following example illustrates certain embodiments of the invention but are not meant to limit the scope of the claims in any way.

EXAMPLE

In the example below, all temperatures are in degrees celsius (unless otherwise indicated) and all percents are weight percent (also unless otherwise indicated). Additionally, the following abbreviations have the following meanings. If an abbreviation is not defined, it has its generally accepted meaning.

CFU = colony forming units
cc (or cm³) = cubic centimeter
cps = centipoise
g = gram
kGy or kGray = kiloGray
mil = one-thousandths of an inch
mL = milliliters
ppm = parts per million Example 1

Sterilization of Liquid Cyanoacrylate Prepolymer Compositions

This example illustrates the electron (E) Beam sterilization of a liquid cyanoacrylate composition to a sterility assurance level of $10^{-6}$ wherein the sterilized composition does not solidify or forms a gel.

Specifically, in a class 10,000 clean room, 1.0 cc capacity high density polyethylene ampules were each filled with 0.5 cc of a liquid cyanoacrylate composition via a Watson-Marlow peristaltic pump fitted with silicone tubing. The cyanoacrylate composition comprised n-butyl cyanoacrylate (99.0+% purity), about 150 ppm of hydroquinone as a free radical polymerization inhibitor and 500 ppm of sulfur dioxide as an acid polymerization inhibitor. Water content and free formaldehyde were kept below 500 ppm in the composition. Bioburden was measured to be less than 1 CFU.

After filling the ampule, the open end of the ampule was heat sealed. The ampule was then placed into a 2 mil poly/foil/poly pouch and the pouch heat sealed. Ten pouched ampules were placed into a paperboard box and 20 (4×5 configuration) of these boxes were placed into a shipping carton.

To achieve E-beam sterilization, three shipping cartons were placed side by side onto a conveyor belt and exposed to high energy E-beam radiation in a single pass from the vertical (smallest dimension) direction. Product bulk density was 0.148 g/cm³. A fluence of 11.1 $\mu C/cm^2$ was chosen to yield a dose of between 15 and 20 kGy. Film dosimeters were placed throughout the load to confirm radiation dosage.

After exposure, the sterilized cyanoacrylate composition was tested for viscosity and setting times (the period of time required for the composition to polymerize on the surface of Earl's balanced salt solution—an aqueous buffered solution). Viscosity and setting times were only slightly altered. Specifically, the viscosity of the cyanoacrylate composition was about 3.5 cps at 20° C. pre-irradiation which increased to about 4.0 cps at 20° C. post-irradiation. Setting times were determined to be about 12 seconds pre-irradiation and about 27 seconds post-irradiation. Chemical purity, hydroquinone and sulfur dioxide levels, as determined by gas chromatography, were also found acceptable. Microbiological assay of the cyanoacrylate composition in the ampules indicated a sterile product with no evidence of bacteriostasis or fungistasis. Accelerated aging of the liquid cyanoacrylate product was done at 50° C. and 75% humidity to simulate room temperature storage for one year. Viscosity of 9 cps at 20° C. and a setting time of 45 seconds were obtained and found acceptable.

The above example demonstrates that E-beam irradiation of packaged cyanoacrylate compositions provides for sterilized packaged compositions suitable for shipment to the ultimate end user.

From the foregoing description, various modifications and changes in the composition and method will occur to those skilled in the art. All such modifications coming within the scope of the appended claims are intended to be included therein.

What is claimed is:

1. A method for preparing a polymerizable, sterile, cyanoacrylate ester composition in a shipping element comprising multiple individual package cyanoacrylate compositions wherein the method comprises:
    (a) selecting a packaging element;
    (b) adding a cyanoacrylate ester composition comprising a polymerizable cyanoacrylate ester to an individual packaging element selected in (a) above; and
    (c) combining multiple individual package elements into a shipping element;
    (d) exposing the shipping element formed in (c) above to a sufficient dosage of E-beam irradiation maintained at an initial fluence of at least 2 $\mu Curie/cm^2$ to sterilize both the packaging elements and the cyanoacrylate ester composition therein without gelling the composition wherein the average bulk density of the materials comprising the shipping element is less than about 0.2 gm/cm³.

2. The method according to claim 1 wherein the polymerizable cyanoacrylate ester is a polymerizable monomer or oligomer of a cyanoacrylate ester which, in monomeric form, is represented by formula I:

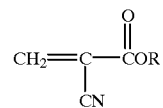

I wherein R is selected from the group consisting of:
    alkyl of 1 to 10 carbon atoms, alkenyl of 2 to 10 carbon atoms,
cycloalkyl groups of from 5 to 8 carbon atoms,
phenyl,
2-ethoxyethyl,
3-methoxybutyl,
and a substituent of the formula:

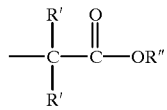

wherein each R' is independently selected from the group consisting of:
hydrogen and methyl, and
R" is selected from the group consisting of:
alkyl of from 1 to 6 carbon atoms,
alkenyl of from 2 to 6 carbon atoms,
alkynyl of from 2 to 6 carbon atoms,
cycloalkyl of from 3 to 8 carbon atoms,
aralkyl selected from the group consisting of benzyl, methylbenzyl and phenylethyl,
phenyl, and
phenyl substituted with 1 to 3 substituents selected from the group consisting of hydroxy, chloro, bromo, nitro, alkyl of 1 to 4 carbon atoms, and alkoxy of from 1 to 4 carbon atoms.

3. The method according to claim 2 wherein R is alkyl of from 4 to 10 carbon atoms.

4. The method according to claim 3 wherein R is alkyl of from 4 to 8 carbon atoms.

5. The method according to claim 4 wherein R is selected from the group consisting of butyl, pentyl or octyl.

6. The method according to claim 5 wherein R is n-butyl.

7. The method according to claim 1 wherein the cyanoacrylate composition further comprises a complex of iodine molecules with a biocompatible polymer.

8. The method according to claim 1 wherein the cyanoacrylate composition further comprises a biocompatible plasticizer.

9. The method according to claim 8 wherein said biocompatible plasticizer is selected from the group consisting of dioctyl phthalate and acetyl tri-n-butyl citrate.

10. The method according to claim 1 wherein the cyanoacrylate composition further comprises a polymerization inhibitor.

11. The method according to claim 10 wherein said polymerization inhibitor is $SO_2$.

12. A method for preparing a polymerizable, sterile, cyanoacrylate ester composition in a shipping element comprising multiple individual packaged cyanoacrylate compositions wherein the method comprises:
(a) selecting a packaging element;
(b) adding a cyanoacrylate ester composition to an individual packaging element selected in (a) above wherein said cyanoacrylate ester composition comprises:
(i) polymerizable cyanoacrylate ester which, in monomeric form, is represented by formula II:

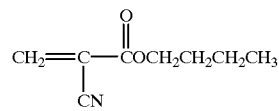

(ii) from about 50 to 500 ppm of $SO_2$;
(iii) from about 10 to 30 weight percent of a biocompatible plasticizer based on the total weight of the composition;
(c) combining multiple individual package elements into a shipping element; and
(d) exposing the shipping element formed in (c) above to a sufficient dosage of E-beam irradiation maintained at an initial fluence of at least 2 $\mu$Curie/cm$^2$ to sterilize both the packaging element and the cyanoacrylate ester composition therein without gelling the composition wherein the average bulk density of the materials comprising the shipping element is less than about 0.2 $\mu$m/cm$^3$.

13. The method according to claim 12 wherein said biocompatible plasticizer is selected from the group consisting of dioctyl phthalate and acetyl tri-n-butyl citrate.

14. The method according to claim 12 wherein said cyanoacrylate composition further comprises an antimicrobially effective amount of a complex of iodine molecules with a biocompatible polymer.

15. The method according to claim 14 wherein the complex of iodine molecules with a biocompatible polymer is povidone iodine.

16. The method according to claim 1 wherein said E-beam dosage is from about 5 to about 50 kGray.

17. The method according to claim 12 wherein said E-beam dosage is from about 5 to about 50 kGray.

18. The method according to claim 1 wherein said E-beam dosage is from about 15 to about 20 kGray.

19. The method according to claim 12 wherein said E-beam dosage is from about 15 to about 20 kGray.

20. A method for preparing a polymerizable, sterile, cyanoacrylate ester composition in a packaging element wherein the method comprises:
(a) selecting a packaging element in the form of an ampule having a neck portion configured for heat sealing after fill;
(b) exposing said ampule to a gas stream comprising a sufficient amount of ethylene oxide to reduce the level of bioburden on the ampule;
(c) selecting a cyanoacrylate ester composition which comprises:
(i) polymerizable cyanoacrylate ester which, in monomeric form, is represented by formula II:

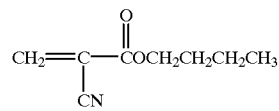

(ii) from about 50 to 500 ppm of $SO_2$;
(iii) from about 10 to 30 weight percent of a biocompatible plasticizer based on the total weight of the composition;
(d) adding the filtered cyanoacrylate ester composition to the ampule prepared in (b) above;

(e) sealing the ampule prepared in (f) by heat sealing the neck portion of said ampule;

(f) combining ampules produced in (e) above into a set of ampules;

(g) sealing the set of ampules formed in (f) above with a secondary sealing means so as to form a unitary packaging element comprising said set of ampules; and (h) exposing the packaging element formed in (g) above to a sufficient dosage of E-beam irradiation maintained at an initial fluence of at least 2 μCurie/cm² to sterilize both the packaging element and the cyanoacrylate ester composition therein without gelling the composition wherein the average bulk density of the materials comprising the packaging element is less than about 0.2 gm/cm³.

21. The method according to claim 20 wherein the cyanoacrylate composition recited in (c) above is first filtered through a filter having a maximum pore size of less than about 1 micron.

22. The method according to claim 20 wherein said biocompatible plasticizer is selected from the group consisting of dioctyl phthalate and acetyl tri-n-butyl citrate.

23. The method according to claim 20 wherein said cyanoacrylate composition further comprises an antimicrobially effective amount of a complex of iodine molecules with a biocompatible polymer.

24. The method according to claim 23 wherein the complex of iodine molecules with a biocompatible polymer is povidone iodine.

25. The method according claim 1 wherein which further comprises exposing a second packaging element comprises a composition containing an antimicrobial agent in the absence of cyanoacrylate ester to the same E-beam.

* * * * *